Patented Dec. 8, 1953

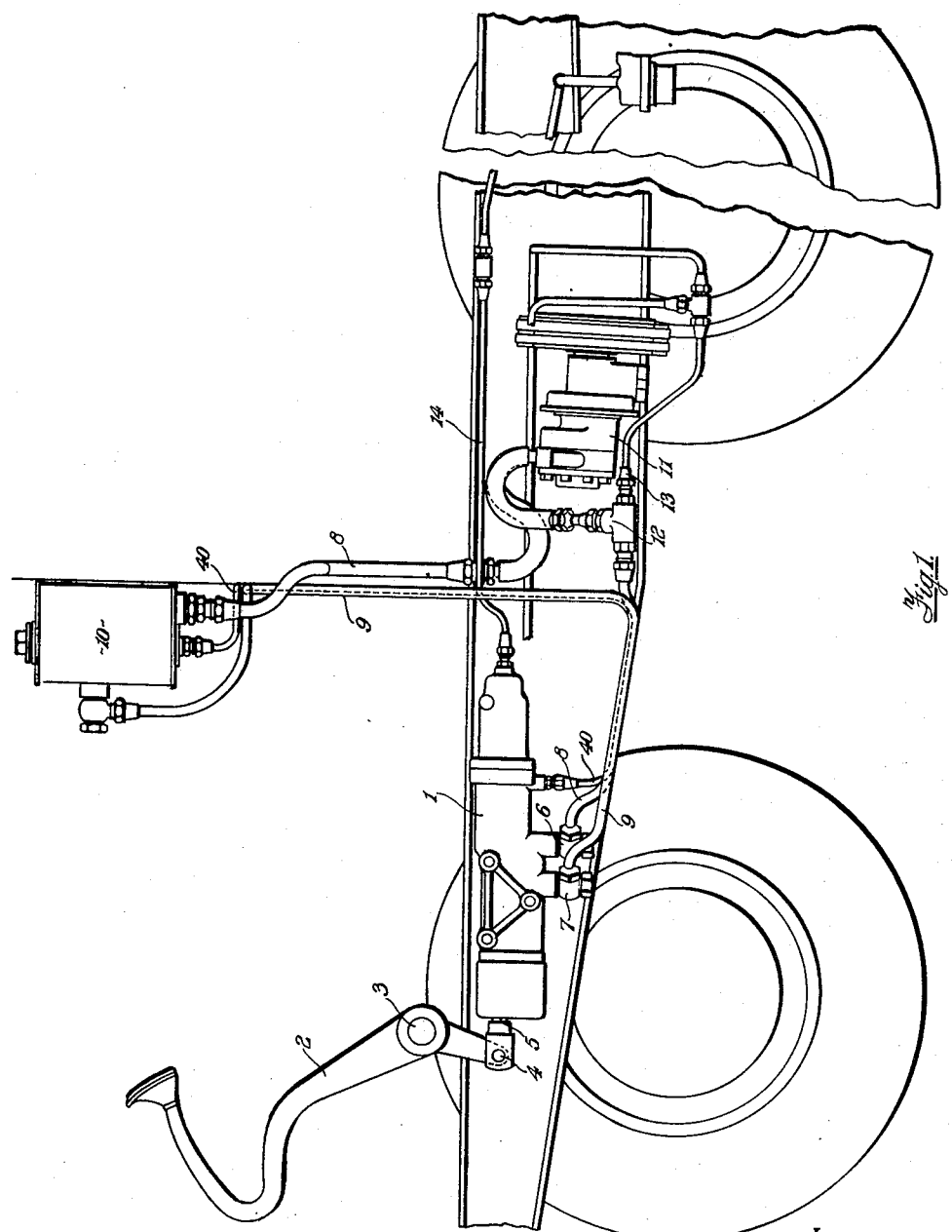

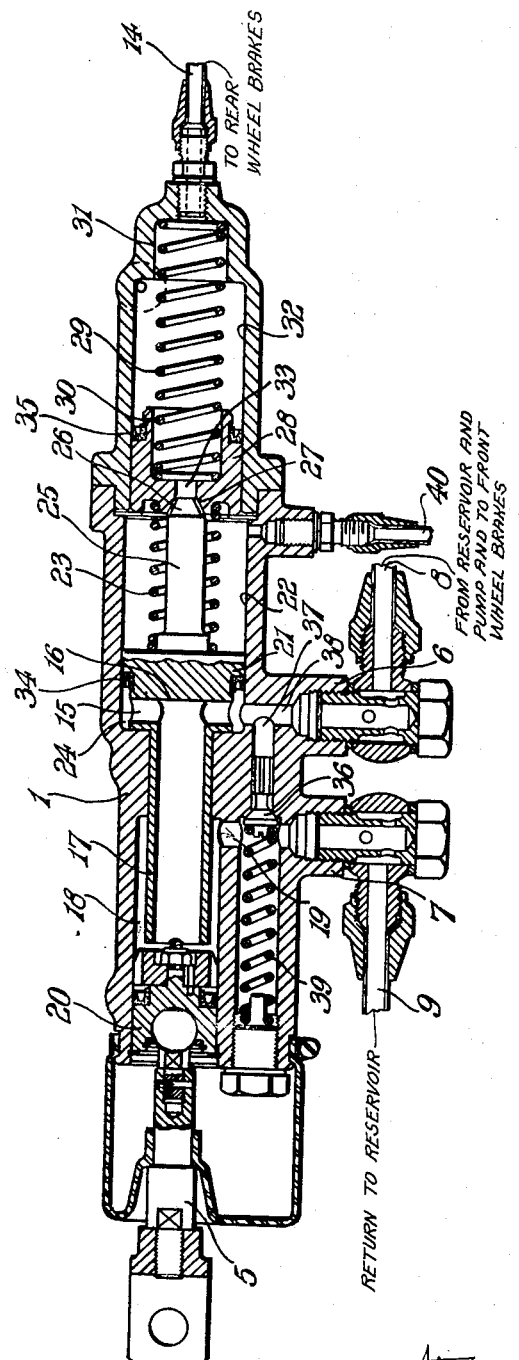

2,661,597

UNITED STATES PATENT OFFICE 2,661,597

HYDRAULIC CONTROL DEVICE

Stanley Howard Edge, Lincoln, England, assignor to Clayton Dewandre Company Limited, Lincoln, England, a British company Application August 2, 1950, Serial No. 177,224

10 Claims. (Cl. 60—52)

This invention relates to hydraulic control mechanism and to the kind wherein a power operated hydraulic circuit is provided with means to interrupt the fluid flow and to divert the power available to operate an output device or devices.

The object of the present invention is to provide an improved construction or arrangement of the kind above described designed to be utilised for the operation of a number of output devices such as the brake actuating cylinders of an automobile vehicle and which is constructed in such a manner that emergency operation either mechanical or by power can be effected in the event of a partial breakdown in the hydraulic transmission means.

According to the invention a hydraulic control mechanism of the kind described is characterised by a constant flow circuit arranged to transmit power directly to one output device or set of devices and indirectly through a sealed hydraulic system to a second input device or set of devices whereby in the event of failure of the flow circuit or of the sealed system, effort can be transmitted by the other.

According to one form of the invention a hydraulic control mechanism of the kind described for controlling the brakes on an automobile vehicle is characterised by a reservoir, valve casing and pump forming a hydraulic circuit, a pedal operated valve device arranged to interrupt the said circuit and set up a pressure within said valve casing which is transmitted therefrom to operate the front wheel brakes, and means also disposed within said casing to transmit the pressure applied through said valve device to a sealed hydraulic system through which impulses are transmitted to the rear wheel brakes.

Reference will now be made to the accompanying drawings which illustrate the application of the invention to the control of brakes on an automobile vehicle and in which:

Fig. 1 is an elevation showing the general layout of the apparatus and

Fig. 2 is a longitudinal sectional view of the control valve mechanism.

In the construction illustrated the apparatus comprises a casing 1 embodying the control valve mechanism which is actuated from a pedal 2 movable about a fixed pivot 3 and connected at 4 to a piston rod 5. The casing 1 has connections at 6 and 7 to flow and return conduits 8 and 9 respectively, which connect the casing 1 with a reservoir 10, a pump 11 being interposed in the flow conduit 8 to maintain a constant flow circuit by withdrawing oil from the reservoir 10, feeding it to the casing 1 and returning it through the conduit 9 to the reservoir. The conduit 8 also includes a T-piece 12 from which a branch conduit 13 passes to the front wheel brake cylinders.

The casing 1 is also connected to a sealed hydraulic system, hereinafter described, and by a conduit 14 to the rear wheel brake actuating cylinders.

Under normal conditions, that is when no braking effort is being applied to the pedal 2, oil from the reservoir 10 passes from the pump 11 into the casing 1 wherein it passes through ports 15 at the closed end 16 of a cylindrical valve member 17, through the said valve member and a chamber 18 around the exterior thereof to an outlet port 19 leading to the return conduit 9 and the reservoir. While this circuit flows freely no effort is transmitted through the connection 13 to the front wheel brake cylinders. When the pedal 2 is operated for brake actuation, this movement is transmitted directly through the piston rod 5 to a piston 20 within the casing 1, the movement of this piston closing the end of the cylindrical valve member 17 thereby interrupting the hydraulic circuit and causing a pressure to be built up within the said cylindrical valve member. This pressure exists also in the flow conduit 8 and is transmitted therefrom through the conduit 13 to the front wheel brake actuating cylinders.

The transmission of the braking effort to the rear wheel brake actuating cylinders is effected through the sealed hydraulic system now to be described. There is formed integral with the closed end of the cylindrical valve member 17 a piston 21 which is in axial alignment with the piston 20 and is movable in a cylinder 22 against the resistance of a spring 23. The construction of the piston 21 is such that its rear portion is of reduced diameter and embodies the ports 15 through which the oil can reach the interior of the valve member 17 under all conditions by passing through an annular space 24 formed within the cylinder 22 by the reduction in diameter of the piston 21. The pressure created in the annular space 24, in the manner described, assists the pedal effort transmitted through the valve member 17 and moves the piston 21 and a plunger 25 carried axially thereof until the end of the plunger which is formed as a coned valve member 26 engages a seating 27 in a third piston 28 also mounted in axial alignment with the piston 20. This third piston is thereby moved against the resistance of a spring 29, one end of which is seated under a recess 30 in the piston 28 and the other end of which is seated in a recess 31 at the end of the casing 1. The movement of the piston 28 creates pressure in the static oil contained within the cylinder 32, wherein the piston is movable, and in the conduit 14 leading to the brake actuating cylinders to cause application of the rear wheel brakes.

When the pressure on the pedal 2 is released the three pistons, 20, 21 and 28 revert to their original positions, shown in Fig. 2, the hydraulic circuit again flows freely and no effort is transmitted to the front or rear wheel brake actuating cylinders.

The spring 23 abuts at its ends against the piston 21 and the piston 28 respectively, and serves the purpose of ensuring removal of the plunger 25 and its valve member 26 from the seating 27 when the mechanism is inoperative, thereby enabling oil to pass through a passage 33 in piston 28, when necessary, to replenish the static system and master cylinder in case of loss of oil by leakage. This supply of oil is derived through a pipe 40 from the reservoir 10. The creation of any back pressure effected by this replenishment is prevented by the relatively small cross-sectional area of the plunger 25. The pistons 21 and 28 carry packings or cup-washers 34 and 35 respectively for the purpose of sealing the static system from the power cylinder where pressure is developed in the annular space 24.

The system is provided with a relief valve comprising a valve member 36 seating at one end of a passage 37 communicating with an inlet port 38 and arranged to open against the resistance of a spring 39 at a predetermined pressure to allow oil to pass directly through the passage 37 from the inlet 38 to the outlet 19 and the return conduit 9.

The arrangement above described possesses the advantage that if the hydraulic circuit actuated by the pump 11 ceases to function for any reason the piston 28 will be operated mechanically by the piston 20 abutting against the valve member 17 and the valve member 26 abutting into the piston 28 when pressure is applied to the pedal 2 thereby setting up a pressure in the static system sufficient to cause application of the brakes to the rear wheels. If, on the other hand, the static system, through which transmission to the rear brake cylinders ordinarily takes place, should break down the hydraulic circuit system can still be employed to operate the front wheel brakes, as this system is sealed from the cylinder 22 by the cup-washer 34 on piston 21.

I claim:

1. A hydraulic mechanism for controlling the front and rear wheel brakes of an automobile, comprising a valve casing having an inlet and an outlet, a reservoir for hydraulic fluid, flow and return conduits connecting the inlet and outlet respectively of the casing to the reservoir, a pump interposed in the flow conduit for circulating hydraulic fluid through the flow and return conduits connecting the casing and reservoir, a connection between the flow conduit and the front wheel brake cylinders, a piston movable in the casing and having a hollow valve member connected thereto, the interior of said hollow valve member normally communicating with said inlet and outlet and providing means of communication between the flow and return conduits to thereby permit free circulation of the hydraulic fluid, said piston having an extension movable therewith and forming a second valve member, a pedal-operated device cooperative with the hollow valve member so as to interrupt communication therethrough from the flow conduit to the return conduit and thereby cause pressure to be developed in the fluid in the flow conduit and cause fluid to be diverted therefrom to the connection to the front wheel brake cylinders to operate them, said piston being subject to pressure of fluid in the flow conduit and movable thereby, a hydraulic system for the rear wheel brake cylinders connected to the casing, a second piston in the casing having a passage therethrough communicating with a hydraulic system and having a valve seat surrounding said passage, said valve seat being so positioned as to be closed by initial movement of said second valve member to close said hydraulic system, and said second piston being movable by a further movement of said second valve member so as to develop an impulse in the fluid in the hydraulic system for transmission to the rear wheel brake cylinders.

2. A hydraulic control mechanism as defined in claim 1, wherein said hollow valve member has an open end which is remote from said piston and is in a position to be closed by said pedal-operated device upon movement thereof, and said first piston is provided with ports which are always in communication with the interior of said hollow valve member and with the flow conduit through said member, and wherein the casing is provided with inlet, and wherein the open end of said hollow a chamber into which the open end of said hollow valve member extends and which is in communication with said outlet and return conduit, and said connection between the flow conduit and the front wheel brake cylinders is direct so that an impulse is transmitted to said brake cylinders whenever the open end of the hollow valve member is closed by said pedal-operated device so as to interrupt the circulation of hydraulic fluid and thereby cause pressure to build up in the flow conduit.

3. A hydraulic control mechanism as defined in claim 1, wherein said hollow valve member has an open end which is remote from said piston to which it is connected, and said pedal-operated device comprises a piston disposed in the casing and movable into abutting engagement with and to close the open end of said hollow valve member and thereby interrupt circulation of the hydraulic fluid and to transmit movement through said hollow valve member to said second valve member.

4. A hydraulic control mechanism as defined in claim 1 wherein said piston connected to said hollow valve member is operative by movement thereof to transmit an impulse through the closed hydraulic system to the rear wheel brake cylinders.

5. A hydraulic control mechanism for controlling the front and rear wheel brakes of an automobile vehicle, comprising in combination, a valve casing having first, second and third cylinders therein and outlets communicating respectively with the first and third cylinders and an inlet communicating with the second cylinder, a reservoir for liquid, flow and return conduits connecting the outlet of the first cylinder and the inlet of the second cylinder to the reservoir, a liquid circulating pump in the flow conduit, a pedal-operated piston in the first cylinder, a spring-loaded second piston in the second cylinder, a tubular extension formed on one side of the second piston and extending co-axially therefrom into the first cylinder, said tubular extension being open at its end which is disposed within the first cylinder, and said second piston having ports therein through which the interior of said tubular extension communicates with said inlet and through which the liquid may normally circulate from the flow conduit through said tubular extension and said outlet in the first cylinder to the return conduit, an elongated valve member projecting from the other side of said second piston, a spring-loaded third piston movable within the third cylinder and having a passage therethrough and a surrounding valve seat for said elongated valve member, a conduit connecting the outlet of the third cylinder with the rear wheel brake cylinders, said third cylinder and connecting conduit being adapted to contain liquid to form a closed hydraulic system, a connection between the second cylinder and the reservoir for delivering liquid to the second cylinder and through said passage in the third piston and the outlet and conduit from the third cylinder to the closed system to replenish the closed system with liquid, and a direct connection between the flow conduit and the front wheel brake cylinders, the pedal-operated piston being operative by its initial movement to close the open end of said tubular extension and thereby interrupt liquid flow therethrough so as to cause fluid pressure to be built up in the flow conduit to operate the front wheel brake cylinders and to act upon the second piston, and said second piston being movable by said pressure and operative by its initial movement to move said elongated valve member onto the valve seat of the third piston to seal the closed hydraulic system, and by its further movement to impart movement to said third piston to transmit pressure through said closed system to operate the rear wheel brake cylinders.

6. A hydraulic control mechanism as defined in claim 5, wherein said passage in said third piston provides communication between said second and third cylinders, and the valve seat of said third piston is engageable by said valve member projecting from said second piston so as to interrupt such communication, and said third piston is movable by thrust transmitted through said elongated valve member of said second piston so as to develop impulses in the closed hydraulic system.

7. A hydraulic control mechanism as defined in claim 5, wherein said second piston has a portion of reduced diameter in which said ports are situated and which forms an annular space within said second cylinder into which fluid from the pump and flow conduit may enter under all conditions.

8. A hydraulic control mechanism as defined in claim 5, including a spring between said second and third pistons and acting to separate the second piston from the third piston to ensure removal of said valve member projecting from the second piston from said seat on the third piston while the mechanism is at rest, and thereby permit fluid from the reservoir to pass through the third piston into said third cylinder to replenish said closed system and the brake cylinders connected thereto.

9. A hydraulic control mechanism as defined in claim 5, including a pressure relief valve within the valve casing and interposed between the inlet to said second cylinder and the outlet from said first cylinder.

10. A hydraulic mechanism for controlling the brakes on an automobile vehicle, comprising a valve casing having first, second and third cylinders therein and outlets communicating respectively with the first and third cylinders and an inlet communicating with the second cylinder, a reservoir for hydraulic fluid, flow and return conduits connecting the inlet of the second cylinder and the outlet of the first cylinder respectively to the reservoir, a pump interposed in the flow conduit, a hollow cylindrical valve member movably mounted in said first cylinder and having an open end disposed in said cylinder, a pedal-operated piston movably mounted in said first cylinder and operative to close the open end of and to impart axial movement to said valve member, a second piston movable in the second cylinder and connected to said hollow valve member, said second piston having a portion of reduced diameter provided with inlet ports communicating with the interior of said hollow valve member and with the inlet of the second cylinder, a stem projecting from the second piston and having a valve member thereon, a third piston movable in the third cylinder and having a valve seat thereon engageable by the valve member on said stem, a connection from the flow conduit to the front wheel brake operating cylinders, and a closed hydraulic system connecting the outlet of said third cylinder with the rear wheel brake operating cylinders.

STANLEY HOWARD EDGE.

References Cited in the file of this patent

UNITED STATES PATENTS

| Number | Name | Date |
|---|---|---|
| 1,921,590 | Staude | Aug. 8, 1933 |
| 2,136,318 | Rossmann | Nov. 8, 1938 |
| 2,343,698 | Parnell | Mar. 7, 1944 |
| 2,410,269 | Chouings | Oct. 29, 1946 |
| 2,499,775 | Piganeau | Mar. 7, 1950 |

FOREIGN PATENTS

| Number | Country | Date |
|---|---|---|
| 113,797 | Australia | Sept. 18, 1941 |
| 476,490 | Great Britain | Dec. 6, 1937 |